United States Patent
Tanaka

(10) Patent No.: US 8,038,832 B2
(45) Date of Patent: Oct. 18, 2011

(54) CURABLE COMPOSITION AND SEALING METHOD

(75) Inventor: Masayuki Tanaka, Hachioji (JP)

(73) Assignee: Three Bond Co., Ltd., Tokyo (JP)

( * ) Notice: Subject to any disclaimer, the term of this patent is extended or adjusted under 35 U.S.C. 154(b) by 815 days.

(21) Appl. No.: 11/994,169

(22) PCT Filed: Jun. 30, 2006

(86) PCT No.: PCT/JP2006/313140
§ 371 (c)(1),
(2), (4) Date: Dec. 28, 2007

(87) PCT Pub. No.: WO2007/004584
PCT Pub. Date: Jan. 11, 2007

(65) Prior Publication Data
US 2009/0025870 A1    Jan. 29, 2009

(30) Foreign Application Priority Data
Jun. 30, 2005    (JP) .................................. 2005-191496

(51) Int. Cl.
*B29C 65/00* (2006.01)
*B32B 37/00* (2006.01)
*B32B 38/04* (2006.01)
*C04B 37/00* (2006.01)
*A61K 6/083* (2006.01)

(52) U.S. Cl. ......................... 156/325; 156/273.3; 522/77

(58) Field of Classification Search .............. 156/273.3, 156/325; 522/77
See application file for complete search history.

(56) References Cited

U.S. PATENT DOCUMENTS
2003/0064232 A1 *  4/2003  Allen et al. .................. 428/447
2003/0138733 A1    7/2003  Sachdev et al.
2004/0029990 A1 *  2/2004  Fujita et al. .................. 522/99

FOREIGN PATENT DOCUMENTS
| EP | 1640391 A1 | 3/2006 |
| JP | 10-152672 A | 6/1998 |
| JP | 2000-72815 A | 3/2000 |
| JP | 2005-89672 A | 1/2005 |
| WO | 2005-000927 A | 1/2005 |
| WO | 2005054390 A1 | 6/2005 |

OTHER PUBLICATIONS http://replay.waybackmachine.org/20050419134547/http://www.aerosil.com/welcome/en/aerosil/default.html "Aerosil"; Apr. 2005.*
European Search Report dated Aug. 25, 2009.
European Office Action, dated Sep. 14, 2010, issued in Application No. 06 780 697.6.
Evonik Industries: "Aerosil fumed silica Product Finder-Full Text Search", Internet Citation, pp. 1-2, XP007914784 [retrieved on Sep. 8, 2010].

* cited by examiner

*Primary Examiner* — Philip Tucker
*Assistant Examiner* — Michael Orlando
(74) *Attorney, Agent, or Firm* — Sughrue Mion, PLLC

(57) ABSTRACT

An object of the present invention is to provide a curable composition excellent in on-site formability, excellent in heat resistance, chemical resistance and oil resistance, and low in compression set. The invention relates to a curable composition comprising (a) a vinyl-based polymer containing at least one (meth)acryloyl group in a molecule thereof and having a number average molecular weight of 500 to 1,000,000, (b) an ethylenic unsaturated group-containing compound, (c) a thixotropic property-imparting agent, (d) fumed silica surface-treated with a (meth)acryloyl group-containing silane and (e) a photopolymerization initiator.

7 Claims, No Drawings

CURABLE COMPOSITION AND SEALING METHOD

TECHNICAL FIELD

The present invention relates to a curable composition comprising a (meth)acryloyl group-containing vinyl-based polymer and a photopolymerization initiator, requiring no secondary curing process such as after-baking while its cured material possesses flexibility, heat resistance and chemical resistance, having good compression set resistance, and being most suitable for a gasket. The present invention also relates to a sealing method using the composition.

BACKGROUND ART

For automotive parts, electrical parts and the like, it becomes necessary to seal the inside from the outside in some cases, in order to prevent internal liquid and gas from leaking outward, or to the contrary, in order to prevent external liquid, gas, dirt and the like from entering inward. Usually, tight seal or sealing can be obtained by bringing members into close contact with each other. However, when hard ones are brought into close contact with each other, it is difficult to obtain an effective sealing effect. In that case, a member such as a relatively soft sheet such as a packing or a gasket or an O-ring is put therebetween, and pressure contacting is performed. At this time, a portion to be brought into abutting contact is usually called a flange. This packing or solid gasket is formed by die molding of paper, cork, rubber or the like or stamping of a sheet.

The above-mentioned packing or solid gasket is required for each form of a part to be sealed, so that there are disadvantages of the increased number of parts and the difficulty of automating incorporation into a part to be sealed, although this is a well-known problem. Accordingly, on-site forming gaskets have been abundantly used in which a liquid sealing member is applied to a flange portion of a part to be sealed, and cured. The on-site forming gaskets are roughly classified into three types. The first is a mold in-place gasket (MIPG) method comprising previously bringing a mold into pressure contact with a flange of a part to be sealed, injecting a liquid sealing member such as a heat curable silicone into a cavity formed between the mold and the flange, and curing it to form a gasket, the second is a formed in-place gasket (FIPG) method comprising automatically applying a liquid sealing material such as a room-temperature (moisture) curable or two-component mixing curable silicone to a flange of a part to be sealed, bringing a flange of another part to be sealed into pressure contact therewith, and aging it for a specified time to cure the liquid sealing material between the flanges, and the third is a cured in-place gasket (CIPG) method comprising applying a liquid sealing material such as a two-component mixing curable or room-temperature (moisture) curable silicone in bead form, and aging or heating it as such for a specified time to form a sealed portion.

The MIPG requires the preparation of a mold for each part to be sealed, so that it is not adequate to small-lot large item products. Moreover, a production technique for preventing the occurrence of burrs is also not easy. The FIPG is easily automated, and in curing and aging, the parts can be allowed to stand as they are combined in many cases. Accordingly, it is excellent in productivity. However, the flanges of the parts to be sealed are laminated at the time when curing has not been caused, so that a sealing layer formed or the sealing material between the flanges becomes a thin film. This is as the flanges are adhered to each other, and shows extremely high seal pressure resistance. On the other hand, one used under severe conditions such as high-temperature conditions or violently vibrating conditions has the possibility that the sealing layer is broken or the possibility that separation occurs at an interface between the sealing material and the flange. Accordingly, the use in such a portion has come to be feared. The CIPG comprises forming the sealing material in bead form, and bringing it into pressure contact with the flange of another member to be sealed. Sealing properties have been maintained by repulsive force generated from elasticity of the sealing material. For that reason, in order to exhibit a long-term sealing effect, it has been necessary that repulsive force is maintained for a long time, that is to say, that a sealing material having low compression set is used.

The sealing material used in the above-mentioned on-site forming gasket is practically one containing an organopolysiloxane as a main component. The organopolysiloxane is referred to as a so-called silicone resin, and excellent in heat resistance and handleability. Many prior art documents including patent document 1 and patent document 2 have been published.
Patent Document 1: JP-A-63-251488
Patent Document 2: JP-A-5-246456

However, in recent years, in portions such as an engine portion in which an engine oil, a gear oil or the like must be sealed at high temperatures, portions have increased in which an oil containing an extreme-pressure additive in increased amounts is used in order to improve lubricating performance. When the silicone resin is used in this site, there has come to cause the problem that the extreme-pressure additive contained in the oil breaks the bond of the organopolysiloxane to deteriorate the sealing material. In particular, in the CIPG, the seal form is in bead form, so that the area which contacts with the oil is large, and the possibility of being deteriorated is high. Accordingly, as described in patent document 3, there is proposed a sealing material using a so-called acrylic rubber in which an acrylic ester is copolymerized, without using the silicone resin. The acrylic rubber is little deteriorated by the extreme-pressure additive, compared to the silicone resin, and useful to such a portion. However, the acrylic rubber represented by patent document 3 is solid at ordinary temperature, so that it can only be used as a solid packing, and has not been able to be readily used in a technique of applying a liquid material and curing it, such as the FIPG or the CIPG.
Patent Document 3: JP-A-8-284746

On the other hand, from long ago, there has been proposed a technique of adding a reactive functional group into a molecule of a relatively low molecular weight copolymer of an acrylic ester and reacting the reactive functional group, thereby performing curing. That is described in patent document 4 and the like. When a composition described in patent document 4 is used, it can be easily applied, because it is liquid at the time of coating, and when it is cured, oil resistance of the acrylic rubber is exhibited. It is therefore an extremely useful composition. However, it is practically difficult to selectively add the reactive functional group in a copolymerization reaction of the acrylic ester, and such a resin has not commercially come in practice. In recent years, reactive liquid acrylic rubbers have been developed by methods described in patent documents 5 to 8 and the like, resulting in the possibility of practical use.
Patent Document 4: JP-A-61-133201
Patent Document 5: JP-A-11-80250
Patent Document 6: JP-A-2000-38404
Patent Document 7: JP-A-2001-271055
Patent Document 8: JP-A-2002-69121

DISCLOSURE OF THE INVENTION

Problems that the Invention is to Solve

When the resin compositions described in patent documents 4 to 8 are applied to the on-site forming gasket of the CIPG method, it is excellent in oil resistance, and the above-mentioned problems are solved. However, compared to the conventional silicone resins, compression set is high, so that there has arisen the disadvantage that repulsive force of the flange to pressure contact decreases with time to deteriorate sealing properties with time. Further, there has also arisen the disadvantage that a sweating phenomenon occurs. The sweating phenomenon as used herein is a phenomenon in which a liquid to be sealed, such as an engine oil, comes into contact with the sealing material, penetrates into the sealing material, and passes through the sealing material to reach the outside, thereby oozing out as the sealing material has sweated. The amount of leakage by the sweating phenomenon is extremely slight, so that there does not arise such a problem that the inner pressure varies or that the amount of the liquid to be sealed decreases. However, dirt such as powder dust and dust becomes easy to adhere to the sealing material in which the sweating phenomenon has occurred, which impairs the appearance of a product. Not only it, but also this has hindered early detection of leakage of contents caused by a defect of the sealing material itself, because it is difficult to be distinguished from oil leakage due to poor sealing. Accordingly, one improved in the above-mentioned problems has been desired.

Means for Solving the Problems

Then, the invention provides a curable composition which contains as a main component a vinyl-based copolymer which is liquid at ordinary temperature before curing, cures for a short period of time, and is excellent in heat resistance, oil resistance and compression set resistance after curing. Further, there is provided a sealing method for effectively performing sealing using this curable composition.

That is to say, the invention provides a curable composition comprising (a) a vinyl-based polymer containing at least one (meth)acryloyl group in a molecule thereof and having a number average molecular weight of 500 to 1,000,000, (b) an ethylenic unsaturated group-containing compound, (c) a thixotropic property-imparting agent, (d) fumed silica and (e) a photopolymerization initiator.

Further, the invention also provides a sealing method comprising the steps of applying the above-mentioned curable composition to at least one side of an article to be sealed, curing the above-mentioned composition by light irradiation, and then, bringing another article to be sealed into pressure contact with the cured composition.

Advantage of the Invention

The invention is a curable composition which is good in oil resistance, chemical resistance and heat resistance. It is excellent in on-site forming performance, and low in compression set which has been a conventional problem. Further, it is one in which the sweating phenomenon does not occur, and can be used without deteriorating sealing performance for a long period of time even in high-temperature environment. Further, the curable composition of the invention is tough and difficult to be scratched in the cured material, and scratches or abrasion is not generated by friction or the like at the time when it is formed as the sealing material and brought into pressure contact with the corresponding flange, which makes reliable sealing possible.

BEST MODE FOR CARRYING OUT THE INVENTION

The invention will be described in detail below.

Component (a) of the invention is a vinyl-based polymer containing at least one (meth)acryloyl group in a molecule thereof and having a number average molecular weight of 500 to 1,000,000. The (meth)acryloyl group as used herein is a general term of an acryloyl group and a methacryloyl group. The (meth)acryloyl group can be represented by the general formula: $-OC(O)C(Ra)=CH_2$, and Ra is a hydrogen atom or a methyl group. Component (a) is a polymer having at least one (meth)acryloyl group and preferably 1.2 to 4 (meth)acryloyl groups, per molecule in a molecule thereof. From the viewpoint of crosslinking of the polymers with each other, less than one group per molecule results in poor curability. Further, although the (meth)acryloyl group may be present on any of a side chain and/or a terminal of the molecule, it is preferred in terms of rubber elasticity and flexibility that it is present on the terminal of the molecule.

The vinyl-based monomer constituting the main chain of component (a) is not particularly limited, and various ones may be used. Examples thereof include (meth)acrylic monomers such as (meth)acrylic acid, methyl(meth)acrylate, ethyl(meth)acrylate, (meth)acrylic acid ester, n-propyl(meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate, phenyl(meth)acrylate, toluoyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxypropyl)trimethoxysilane, an ethylene oxide adduct of (meth)acrylic acid, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl(meth)acrylate, 2-perfluoromethyl-2-perfluoroethylmethyl(meth)acrylate, 2-perfluorohexylethyl(meth)acrylate, 2-perfluorodecylethyl(meth)acrylate and 2-perfluorohexadecylethyl(meth)acrylate; aromatic vinyl-based monomers such as styrene, vinyltoluene, α-methylstyrene, chlorostyrene, styrenesulfonic acid and a salt thereof; fluorine-containing vinyl monomers such as perfluoroethylene, perfluoropropylene and vinylidene fluoride; silicon-containing vinyl-based monomers such as vinyltrimethoxysilane and vinyltriethoxysilane; maleic anhydride, maleic acid and monoalkyl ester and dialkyl ester of maleic acid; fumaric acid and monoalkyl ester and dialkyl ester of fumaric acid; maleimide-based monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group-containing vinyl-based monomers such as acrylonitrile and methacrylonitrile; amido group-containing vinyl-based monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol and the like. These may be used alone, or a plurality thereof may be copolymerized. From physical properties and the like of a product, aromatic vinyl-based monomers and (meth)acrylic monomers are preferred among others. More preferred are an acrylic acid ester monomer and a methacrylic acid ester monomer, particularly preferred is an acrylic acid ester monomer, and still more preferred is butyl acrylate. In the invention, these preferred monomers may be copolymerized with another monomer described above. In that case, these preferred monomers are preferably contained in the polymer in an amount of 40% or more by weight ratio.

The lower limit of the number average molecular weight of the polymer is 500 and preferably 3,000, and the upper limit thereof is 1,000,000 and preferably 500,000. When the number molecular weight is less than 500, it tends to become difficult to express the original characteristics of the vinyl-based polymer. On the other hand, exceeding 1,000,000 results in the difficulty of handling.

The vinyl-based polymer can be obtained by various polymerization methods, and the methods are not particularly limited. However, radical polymerization methods are preferred in terms of the versatility of the monomer and the easiness of control. Of the radical polymerization methods, controlled radical polymerization is preferred, living radical polymerization is more preferred, and atom transfer radical polymerization is particularly preferred. These methods are already known methods and described in detail in the above-mentioned patent documents 4 to 8.

Further, methods for introducing the (meth)acryloyl group into the vinyl-based polymer include (1) a method by a reaction of a vinyl-based polymer having a hydroxyl group on its terminal with a (meth)acrylate compound containing chlorine, bromine or a hydroxyl group, (2) a method by a reaction of a vinyl-based polymer having a halogen group on its terminal with an alkali metal ion- or quaternary ammonium ion-containing (meth)acrylate compound, and (3) a method of reacting a diisocyanate compound with a vinyl-based polymer having a hydroxyl group on its terminal, and reacting a residual isocyanate group with a hydroxyl group-containing (meth)acrylate. These methods are also already known methods and described in detail in the above-mentioned patent documents 4 to 8.

Ethylenic unsaturated group-containing compound (b) of the invention is added for the purposes of imparting toughness to a cured material, improving surface curability, improving workability, and the like.

The ethylenic unsaturated group is radically polymerizable or anionically polymerizable, and the compound having the ethylenic unsaturated group is a radically polymerizable or anionically polymerizable monomer or oligomer. The ethylenic unsaturated group as used herein means a carbon-carbon double bond represented by C=C—, and includes a functional group having C=C—. The functional groups having C=C— include a (meth)acryloyl group, an acrylamido group, an acrylonitrile group, a styrene group, a vinyl ester group, an N-vinylpyrrolidone group, a conjugated diene group, a vinylketone group, a vinyl chloride group and the like. One having a (meth)acryloyl group, which is similar to the polymer of the invention, is preferred among others.

The ethylenic unsaturated group-containing compounds include a monofunctional group having one ethylenic unsaturated group described above, a bifunctional monomer having two ethylenic unsaturated groups, a trifunctional monomer having three ethylenic unsaturated groups and a multifunctional monomer having four or more ethylenic unsaturated groups.

Monofunctional monomers include (meth)acrylic acid, methyl(meth)acrylate, butyl(meth)acrylate, ethylhexyl (meth)acrylate, isooctyl(meth)acrylate, isononyl(meth)acrylate, lauryl(meth)acrylate, stearyl(meth)acrylate, tetrahydrofurfuryl(meth)acrylate, caprolactone-modified tetrahydrofurfuryl(meth)acrylate, cyclohexyl(meth)acrylate, cyclopentanyl(meth)acrylate, isobornyl(meth)acrylate, benzyl(meth)acrylate, phenyl(meth)acrylate, phenoxyethyl (meth)acrylate, phenoxydiethylene glycol(meth)acrylate, phenoxytetraethylene glycol(meth)acrylate, nonylphenoxyethyl(meth)acrylate, nonylphenoxytetraethylene glycol (meth)acrylate, methoxydiethylene glycol(meth)acrylate, ethoxydiethylene glycol(meth)acrylate, butoxyethyl(meth) acrylate, butoxytriethylene glycol(meth)acrylate, 2-ethylhexylpolyethylene glycol(meth)acrylate, nonylphenylpolypropylene glycol(meth)acrylate, methoxydipropylene glycol(meth)acrylate, glycidyl(meth) acrylate, 2-hydroxyethyl(meth)acrylate, 2-hydroxypropyl (meth)acrylate, glycerol(meth)acrylate, polyethylene glycol (meth)acrylate, polypropylene glycol(meth)acrylate, epichlorohydrin (hereinafter abbreviated as ECH)-modified (meth)acrylate, ECH-modified phenoxy(meth)acrylate, ethylene oxide (hereinafter abbreviated as EO)-modified phthalic acid(meth)acrylate, EO-modified succinic acid (meth)acrylate, caprolactone-modified 2-hydroxyethyl (meth)acrylate, N,N-dimethylaminoethyl(meth)acrylate, N,N-diethylaminoethyl(meth)acrylate, morpholino(meth) acrylate, phosphoric acid(meth)acrylate and the like.

Further, the bifunctional monomers include 1,3-butylene glycol di(meth)acrylate, 1,4-butylene glycol di(meth)acrylate, neopentyl glycol di(meth)acrylate, 1,6-hexane glycol di(meth)acrylate, ethylene glycol di(meth)acrylate, polyethylene glycol di(meth)acrylate, propylene glycol di(meth) acrylate, tripropylene glycol di(meth)acrylate, EO-modified neopentyl glycol di(meth)acrylate, propylene oxide (hereinafter abbreviated as PO)-modified neopentyl glycol di(meth) acrylate, bisphenol A di(meth)acrylate, EO-modified bisphenol A di(meth)acrylate, ECH-modified bisphenol A di(meth) acrylate, EO-modified bisphenol S di(meth)acrylate, hydroxypivalic acid ester neopentyl glycol diacrylate, caprolactone-modified hydroxypivalic acid ester neopentyl glycol diacrylate, neopentyl glycol-modified trimethylolpropane di(meth)acrylate, stearic acid-modified pentaerythritol di(meth)acrylate, dicyclopentenyl diacrylate, EO-modified dicyclopentenyl di(meth)acrylate, di(meth)acryloyl isocyanurate and the like.

Furthermore, the trifunctional monomers include trimethylolpropane tri(meth)acrylate, pentaerythritol tri(meth) acrylate, EO-modified trimethylolpropane tri(meth)acrylate, PO-modified trimethylolpropane tri(meth)acrylate, ECH-modified trimethylolpropane tri(meth)acrylate, ECH—modified glycerol tri(meth)acrylate, tris(acryloyloxyethyl) isocyanurate and the like.

The multifunctional monomers include ditrimethylolpropane tetra(meth)acrylate, pentaerythritol tetra(meth)acrylate, dipentaerythritol monohydroxypenta(meth)acrylate, alkyl-modified dipentaerythritol pentaacrylate, dipentaerythritol hexa(meth)acrylate, caprolactone-modified dipentaerythritol hexa(meth)acrylate and the like.

The amount of component (b) added is preferably form 1 to 30 parts by weight based on 100 parts by weight of component (a). Less than 1 part by weight results in a tendency of handling properties to deteriorate or a tendency of mechanical strength of a cured material to decrease, and more than 30 parts by weight results in a tendency of oil resistance of a cured material to deteriorate.

Thixotropic property-imparting agent (c) of the invention is a substance which gives a thixotropic property to a composition by adding it. The thixotropic property means a performance that viscosity is high in a still standing situation and decreases in a state in which stress is applied (flow state). The addition of the thixotropic property-imparting agent can prevent an applied composition from running and sagging. Examples of the thixotropic property-imparting agents include, for example, organic compounds such as amide wax represented by Disparon (manufactured by Kusumoto Chemicals, Ltd.), hydrogenated castor oil, a fatty acid derivative and a 1,3,5-tris(trialkoxysilylalkyl)isocyanurate, and inorganic compounds such as calcium carbonate surface-treated with a fatty acid or a resin acid, fumed silica, carbon black, kaolin, clay, activated clay, silica sand, quartzite, diatomaceous earth, anhydrous aluminum silicate, hydrated magnesium silicate, talc, perlite, white carbon, fine mica powder, bentonite and organic bentonite.

Fumed silica produced by reacting a silicon-containing volatile compound in a gas phase and organic bentonite are preferred among others. Further, it preferably has a specific surface area of 50 to 400 $m^2/g$. Furthermore, although either hydrophilic silica or hydrophilic silica can be used, hydrophobic fumed silica whose surface is hydrophobically surface-treated with a silazane, a chlorosilane, an alkoxysilane or a polysiloxane which has only a methyl group as an organic substituent group bonding to a silicon atom is preferred.

Specific examples of surface-treating agents for the surface treatment include silazanes such as hexamethylsilazane; halogenated silanes such as trimethylchlorosilane, dimethyldichlorosilane and methyltrichlorosilane; alkoxysilanes such as a trimethylalkoxysilane, a dimethyldialkoxysilane and a methyltrialkoxysilane (wherein the alkoxy groups include a methoxy group, an ethoxy group, a propoxy group, a butoxy group and the like); and siloxanes such as cyclic or straight-chain polydimethylsiloxane. These may be used either alone or as a combination of two or more thereof. Of these, hydrophobic fumed silica surface-treated with the siloxane (dimethylsilicone oil) is preferred in terms of a thixotropic property-imparting effect. However, fumed silica surface-treated with a (meth)acryloyl group-containing silane, such as component (d) described later, is low in ability for increasing viscosity of the composition, so that it is unsuitable to use fumed silica surface-treated with a (meth)acryloyl group-containing silane.

Further, when a polyether compound such as diethylene glycol, triethylene glycol or polyethylene glycol, a reaction product of a polyether compound and a functional silane, or an ethylene oxide chain-containing nonionic surfactant is used in combination with fumed silica, the thixotropic property increases. One or two or more kinds of the nonionic surfactants may be used.

Specific examples of these fumed silica and surface-treated fumed silica include, for example, commercial items such as Aerosil R974, R972, R972V, R972CF, R805, R812, R812S, R816, R8200, RY200, RX200, RY200S, #130, #200, #300 and R202 (trade names) manufactured by Nippon Aerosil Co., Ltd. Nipsil SS series (trade names) manufactured by Nihon Silica Kogyo Co., Ltd. Rheorosil MT-10, MT-30, QS-102 and QS-103 (trade names) manufactured by Tokuyama Soda Co., Ltd. and Cabosil TS-720, MS-5 and MS-7 (trade names) manufactured by Cabot Corporation.

Further, the organic bentonite means one in which a powdery material obtained by finely pulverizing mainly montmorillonite ore is surface-treated with various organic materials. As the organic compounds, there are used an aliphatic primary amine, an aliphatic quaternary amine and the like (all of these amines preferably have 20 or less carbon atoms). Specific examples of the organic bentonite include, for example, S-BEN and Organite manufactured by Hojun Yoko Co., Ltd., Orben D and New D Orben (trade names) manufactured by Shiraishi Kogyo, Hardsil manufactured by Tsuchiya Kaolin Industry Co., Ltd., Clay #30 manufactured by Bergess Pigment Co., #33 manufactured by Southern Clay Products, Inc. Bentone 34 (dimethyloctadecylammonium bentonite) manufactured by US National Lead, and the like.

The amount of component (c) added can not be categorically determined, because the thixotropic property-imparting effect varies depending on the compound used, and the desired thixotropic property varies depending on the place to which the composition is applied or the performance of a coater. However, it is preferably form 1 to 20 parts by weight based on 100 parts by weight of the total amount of component (a) and component (b). Less than 1 part by weight results in a tendency of failing to impart the sufficient thixotropic property, whereas more than 20 parts by weight results in a tendency of handling properties to significantly deteriorate.

A surface of methacryloyl group-containing, silane-surface-treated fumed silica (d) of the invention is surface-treated with a specific compound, thereby imparting a sufficient compression set resistance performance to a cured material of component (a) and component (b), and also imparting an oil resistance performance. Further, the scratch resistance of the cured material is improved, and this component is a particularly important component of the components constituting the curable composition according to the invention.

The compounds with which fumed silica is surface-treated include (meth)acryloyl group-containing silane compounds such as acryloylpropyltrimethoxysilane, acryloylethyltrimethoxysilane, acryloylpropyltriethoxysilane, acryloylethyltriethoxysilane, methacryloylpropyltrimethoxysilane, methacryloylethyltrimethoxysilane, methacryloylpropyltriethoxysilane and methacryloylethyltriethoxysilane. As a method of surface treatment, there can be used an ordinarily known method. For example, the above-mentioned untreated fumed silica and the surface-treating agent are placed in a mechanical kneader sealed under ordinary pressure, or in a fluidized bed, and subjected to mixing treatment at room temperature or by heat treatment, under the presence of an inert gas as needed. The treatment may be accelerated using a catalyst in some cases. A surface-treated material is prepared by drying after kneading.

Component (d) is commercially available as an industrial product. Examples thereof include Aerosil R7200 and Aerosil R711 (manufactured by Nippon Aerosil Co., Ltd.). Although there is no particular limitation on the particle size of component (d), one having a particle size of about 1 to 500 nm can be used. The amount of component (d) added is preferably from 1 to 30 parts by weight based on 100 parts by weight of the total amount of component (a) and component (b). Less than 1 part by weight results in a tendency of the compression set of a cured material to increase. When it is more than 30 parts by weight, the effect reaches its peak, which causes an economical disadvantage.

Photopolymerization initiator (e) of the invention is one which generates an active radical species or an anionic species by ultraviolet irradiation to polymerize components (a) and (b). Component (e) is already known as the name of a photoinitiator. As the photoinitiator, a known photopolymerization catalyst can be appropriately used. Specific examples thereof include acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 2,2-diethoxyacetophenone, p-diacetylbenzene, 3-methoxybenzophenone, 2,4,6-trimethylbenzophenone, oligo(2-hydroxy-2-methyl-1-(4-(1-methylvinyl)phenyl)propanone), 4-allylacetophenone, camphorquinone, 2,4,6-trimethylbenzoyldiphenylphosphine oxide, 4-methylbenzophenone, 4-chloro-4'-benzylbenzophenone, 2-hydroxy-2-methyl-1-phenyl-1-propanone, 3-chloroxanthone, 3,9-dichloroxanthone, 3-chloro-8-nonylxanthone, benzoyl, benzoyl methyl ether, benzoin butyl ether, bis(4-dimethylaminophenyl)ketone, benzyl methoxyketal, 2-chlorothioxanthone, o-methyl benzoate, benzyl dimethyl ketal, methyl benzoyl formate and the like.

The amount of component (e) added is such an amount that the composition is photoinduced, and what is necessary is just to adjust it to the range of 1 to 10 parts by weight based on 100 parts by weight of the total weight of component (a) and component (b). In general, however, it is preferably adjusted to the range of 1 to 5 parts by weight. Further, in addition to component (e), a thermal polymerization initiator, a redox polymerization initiator or the like can be used together to add a thermal polymerization performance, a redox polymerization performance or the like.

In order to adjust physical properties, various additives, for example, an antiaging agent, a plasticizer, a physical property-adjusting agent, a solvent and the like, may be incorporated in the curable composition of the invention. The (meth) acrylic polymer is originally a polymer excellent in heat resistance, weather resistance and durability, so that the antiaging agent is not necessarily required. However, a conventionally known antioxidant and light stabilizer can be appropriately used. Further, the antiaging agent can also be used for polymerization control at the time of polymerization, and physical properties can be controlled.

As the antioxidants, various ones have been known, and examples thereof include thioether-based antioxidants such as MARK PEP-36 and MARK AO-23 (both the above are manufactured by Adeca Argus Chemical Co., Ltd.) and phosphorous-based antioxidants such as Irgafos 38, Irgafos 168 and Irgafos P-EPQ (all the above are manufactured by Nihon Ciba-Geigy K.K.). Above all, hindered phenol-based compounds as shown below are preferred.

Specific examples of the hindered phenol-based compounds include 2,6-di-t-butyl-4-methylphenol, 2,6-di-t-butyl-4-ethylphenol, mono (or di or tri)(α-methylbenzyl)phenol, 2,2'-methylenebis(4-ethyl-6-t-butylphenol), 2,2'-methylenebis(4-methyl-6-t-butylphenol), 4,4'-butylidenebis(3-methyl-6-t-butylphenol), 4,4'-thiobis(3-methyl-6-t-butylphenol), 2,5-di-t-butylhydroquinone, 2,5-di-t-amylhydroquinone, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl-tetraquis[3-(3,5-di-t-butyl-4-hydroxyphenyl)propionate], 2,2-thio-diethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy-hydrocinnamide), 3,5-di-t-butyl-4-hydroxy-benzylphosphonate-diethyl ester, 1,3,5-trimethyl-2,4,6-tris(3,5-di-t-butyl-hydroxybenzyl)benzene, calcium bis(ethyl 3,5-di-t-butyl-4-hydroxy-benzylphosphonate), tris(3,5-di-t-butyl-4-hydroxybenzyl)isocyanurate, 2,4-2,4-bis[(octylthio) methyl]o-cresol, N,N'-bis[3-(3,5-di-t-butyl-4-hydroxyphenyl)propionyl]hydrazine, tris(2,4-di-t-butylphenyl) phosphite, 2-(5-methyl-2-hydroxyphenyl)benzotriazole, 2-[2-hydroxy-3,5-bis(α,α-dimethylbenzyl)phenyl]-2H-benzotriazole, 2-(3,5-di-t—butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)benzotriazole, a methyl-3-[3-t-butyl-5-(2H-benzotriazole-2-yl)-4-hydroxyphenyl]propionate-polyethylene glycol (molecular weight: about 300) condensate, a hydroxyphenylbenzotriazole derivative, bis(1,2,2,6,6-pentamethyl-4-piperidyl) 2-(3,5-di-t-butyl-4-hydroxybenzyl)-2-n-butylmalonate, 2,4-di-t-butylphenyl 3,5-di-t—butyl-4-hydroxybenzoate and the like.

Mentioned by trade names, there can be exemplified but are not limited to Nocrak 200, Nocrak M-17, Nocrak SP, Nocrak SP-N, Nocrak NS-5, Nocrak NS-6, Nocrak NS-30, Nocrak 300, Nocrak NS-7 and Nocrak DAH (all the above are manufactured by Ouchi Shinko Chemical Industrial Co., Ltd.), MARK AO-30, MARK AO-40, MARK AO-50, MARK AO-60, MARK AO-616, MARK AO-635, MARK AO-658, MARK AO-80, MARK AO-15, MARK AO-18, MARK AO-328 and MARK AO-37 (all the above are manufactured by Adeca Argus Chemical Co., Ltd.), IRGANOX-245, IRGANOX-259, IRGANOX-565, IRGANOX-1010, IRGANOX-1024, IRGANOX-1035, IRGANOX-1076, IRGANOX-1081, IRGANOX-1098, IRGANOX-1222, IRGANOX-1330 and IRGANOX-1425WL (all the above are manufactured by Nihon Ciba-Geigy K.K.), Sumilizer GA-80 (manufactured by Sumitomo Chemical Co., Ltd.) and the like.

The antioxidants further include a monoacrylate phenol-based antioxidant having both an acrylate group and a phenol group, a nitroxide compound and the like. As the monoacrylate phenol-based antioxidants, there are exemplified, for example, 2-t-butyl-6-(3-t-butyl-2-hydroxy-5-methylbenzyl)-4-methylphenyl acrylate (trade name: Sumilizer GM), 2,4-di-t-amyl-6-[1-(3,5-di-t-amyl-2-hydroxyphenyl)ethyl]phenyl acrylate (trade name: Sumilizer GS) and the like. As the nitroxide compounds, there are exemplified a 2,2,6,6-substituted-1 piperidinyloxy radical, a 2,2,5,5-substituted 1-pirrolidinyloxy radical and a nitroxy free radical from a cyclic hydroxylamine, although they are not limited. As the substituent group, an alkyl group having 4 or less carbon atoms such as a methyl group or an ethyl group is suitable. Specific examples of the nitroxy free radical compounds include but are not limited to a 2,2,6,6-tetramethyl-1-piperidinyloxy radical (TEMPO), a 2,2,6,6-tetraethyl-1-piperidinyloxy radical, a 2,2,6,6-tetramethyl-4-oxo-1-piperidinyloxy radical, a 2,2,5,5-tetramethyl-1-pirrolidinyloxy radical, 1,1,3,3-tetramethyl-2-isoindolinyloxy radical, an N,N-di-t-butylamineoxy radical and the like. A stable free radical such as a galvinoxyl free radical may be used in lieu of the nitroxy free radical.

The antioxidant may be used in combination with the light stabilizer (for example, bis(1,2,2,6,6-pentamethyl-4-piperidyl)sebacate (trade name: Sanol) or the like). The combined use more exerts the effect thereof, and particularly improves heat resistance in some cases, so that it is particularly preferred. In addition, there may be used Tinuvin C353 and Tinuvin B75 (both the above are manufactured by Nihon Ciba-Geigy K.K.) and the like in which the antioxidant and the light stabilizer have previously been mixed.

The curable composition of the invention can be cured by light irradiation, typically ultraviolet irradiation. The above-mentioned curable composition can be formed as a sealing material, using the following forming methods. That is to say, a flange as an article to be sealed is coated with the above-mentioned curable composition in bead form by an automatic coater or the like. It is preferred to select as the automatic coater one in which a two-dimensional operation or a three-dimensional operation is possible, and to previously teach a form of the article to be sealed. The applied curable composition is irradiated with light such as ultraviolet light, thereby curing the curable composition. At this time, it may be cured as applied in bead form. However, a surface of the material applied in bead form may be covered with a covering mold or the like to optimize the bead form, followed by curing. As the covering mold, there can be used one shown, for example, in JP-A-60-237267. It is necessary that hollow grooves are formed on the covering mold, and that the sealing material formed is adjusted so as to convexly protrude from the flange surface. The surface of the sealing material cured by the covering mold is smoothened, and the height and width of the convex also become constant. Further, in coating with a nozzle, a seam is liable to occur between a coating initiation position and a coating termination position, but there is a merit that uniform compensation is performed by forming with the covering mold. However, the covering mold is not necessarily required, when the sealing material is formed in bead form. Further, it is more effective to use a light-transmittable covering mold.

The sealing material formed as described above joins the flange portions of the opposed articles to be sealed, and pressure contacting is performed. At this time, in order to exert a reliable sealing effect, pressure contacting is preferably performed by such force that the compressibility of the sealing material becomes a compression of 10% or more. The preferred compressibility is from 10 to 40%. The sealing material which has cured the curable composition of the invention has low compression set, so that repulsive force is not lost, even when such compression is performed in high-temperature environment for a long time, thus being able to exert highly reliable sealing performance.

EXAMPLES

Specific examples of the present invention will be illustrated below in conjunction with comparative examples, but the invention should not be construed as being limited to the following examples. In addition, in the following examples and comparative examples, parts are given by weight.

In the following examples, the "number average molecular weight" and "molecular weight distribution (the ratio of the weight average molecular weight and the number average molecular weight)" were calculated by a standard polystyrene conversion method using gel permeation chromatography (GPC), provided that two columns filled with a crosslinked styrene gel (Shodex GPCK-802.5 manufactured by Show Denko K.K. and Shodex GPCK-804 manufactured by Show Denko K.K.) were connected in series to use as GPC columns, and chloroform was used as a GPC solvent.

Production Example 1

Synthesis of Poly(n-Butyl Acrylate) Having Acryloyl Groups on Both Terminals Thereof Using cuprous bromide as a catalyst, pentamethyldiethylenetriamine as a ligand, and diethyl 2,5-dibromo-adipate as an initiator, n-butyl acrylate was polymerized to obtain bromine group-terminated poly(n-butyl acrylate) having a number average molecular weight of 25200 and a molecular weight distribution of 1.20. In N,N-dimethylacetamide (300 ml), 300 g of this polymer was dissolved, and 5.3 g of potassium acrylate was added, followed by heating and stirring under a nitrogen atmosphere at 70° C. for 3 hours to obtain a mixture of poly(n-butyl acrylate) having acryloyl groups on both terminals thereof (hereinafter referred to as polymer 1). After N,N-dimethylacetamide in this mixed solution was removed by distillation under reduced pressure, toluene was added to a residue, and insoluble matter was removed by filtration. Toluene in a filtrate was removed by distillation under reduced pressure to purify polymer 1. The number average molecular weight of polymer 1 after purification was 27100, the molecular weight distribution was 1.31, and the average number of terminal acryloyl groups was 2.0 (that is to say, the introduction rate of acryloyl groups to the terminals was 100%).

Example 1

As component (a), there was weighed 100 parts by weight of polymer 1 obtained in Production Example 1, and 15 parts by weight of hydroxyethyl methacrylate as component (b), 5 parts by weight of Aerosil RY200 (manufactured by Nippon Aerosil Co., Ltd., fumed silica surface-treated with dimethylsilicone, specific surface area: 100 $m^2/g$) as component (c), 20 parts by weight of Aerosil R711 (manufactured by Nippon Aerosil Co., Ltd., fumed silica surface-treated with methacryloylpropyltrimethoxysilane, specific surface area: 200 $m^2/g$) as component (d) and 1 part by weight of 2,2-diethoxyacetophenone as component (e) were used. These were thoroughly mixed by a planetary mixer, and then, defoamed to obtain a curable composition.

Examples 2 to 7 and Comparative Examples 1 to 5

Similarly using various kinds of components described in Table 1, curable compositions were obtained.

In the table, polymer 1 is the above-mentioned polymer 1, polymer 2 is Polyacrylate RC200C (manufactured by Kaneka Corporation, an acrylic copolymer having methacryloyl groups on both terminals thereof, number average molecular weight: 20,000), organic bentonite is Orben D manufactured by Shiraishi Kogyo Kaisha, Ltd., Aerosil 1 is Aerosil R972 which is fumed silica surface-treated with dimethyldichlorosilane, Aerosil 2 is Aerosil R805 which is fumed silica surface-treated with octylsilane, Aerosil 3 is Aerosil RX300 which is fumed silica surface-treated with hexamethylsilazane (Aerosil R972, Aerosil R805 and Aerosil RX300 are all manufactured by Nippon Aerosil Co., Ltd.), photoinitiator 1 is 2,2-diethoxyacetophenone described above, and photoinitiator 2 is 2-hydroxy-2-methyl-1-phenylpropane-1-one.

Compression Set Test: The resulting respective compositions were irradiated with ultraviolet light having an accumulated light volume of 45 $kJ/m^2$ by using a 4-kW high-pressure mercury lamp (main wavelength: 365 nm) to cure them, and tested based on the (compression) set test method specified in JIS K 6262, provided that the compressibility was 25%, the test temperature was 150° C., and the time was 100 hours.

Pressure Leakage Test and Sweating Test: The tests were conducted using a flange pressure vessel for pressure tests specified in JIS K 6820 as an experimental apparatus. Each curable composition was applied to an approximately center portion of a flange of a lower vessel of this simulated vessel, circularly along a flange form at a bead width of 5 mm and a height of 3 mm. Then, the curable composition was irradiated with ultraviolet light having an accumulated light volume of 45 kJ/m² by using a 4-kW high-pressure mercury lamp (main wavelength: 365 nm) to form a sealing material.

The flange of the lower vessel on which the sealing material was formed was allowed to face to a flange of an upper vessel, and both flanges were fastened using a bolt, thereby compressing the sealing material. The fastening was carried out until the compressibility of the sealing material reached about 30%. Then, an SG5W-30 engine oil was fully poured into the vessel through a hole formed at a bottom portion of the lower vessel, and the hole was sealed. This was placed in a heating furnace of 150° C., and heated for 1000 hours. The inner pressure in the vessel increased by heating.

After the heating was finished, a flange joint was examined by visual observation, a finger touch and contact of filter paper without disassembling the vessel to confirm leakage of the engine oil, and a white powder was sprinkled on the flange joint to confirm the presence or absence of the sweating phenomenon. When the engine oil adhered to the sealing material, the results of the sweating test was taken as "poor", and when the engine oil adhered to the flange portion other than the sealing material or leaked, the results of the leakage test was taken as "poor".

Abrasion Resistance Test: A sealing material was formed in a flange pressure vessel for pressure tests specified in JIS K 6820 in the same manner as in the above-mentioned pressure leakage test under the same conditions. A surface of the sealing material formed was rubbed for 10 reciprocations with commercially available steal wool by hand at a force of 110 to 120 g. Then, in the same manner as in the above-mentioned pressure leakage test, assembling was performed, and the engine oil was poured into the vessel. Heating was performed under the same conditions, and it was measured whether leakage occurred or not.

The results thereof are shown in Table 1.

kets of the CIPG method, and can be utilized in various applications such as sealing materials for automotive oil pans, locker covers and the like, sealing materials in architectural elastic sealing materials, sealing materials for double glass and the like, materials for electric and electronic parts such as solar battery backside sealants.

Further, the curable composition of the invention has low compression set, and is applicable not only for the above-mentioned applications, but also for the following applications. For example, in the automotive filed, as body parts, it can be used in materials for preventing vibration of glass and vibration-proof materials for body sites, particularly in window seal gaskets and door glass gaskets. As chassis parts, it can be used in engines for vibration insulation and sound insulation and suspension rubbers, particularly engine mount rubbers. As engine parts, it can be used in hoses for cooling, fuel supply, exhaust control and the like, sealing materials for engine oils and the like. Further, it can also be used in exhaust gas purifier parts and brake parts. In the appliance field, it can be used in packings, O-rings, belts and the like. Specifically, they include ornaments, waterproof packings, vibration-proof rubbers and insect-proof packings for lighting fixtures, vibration insulation-sound insulation and air sealing materials for cleaners, drip-proof covers, waterproof packings, heater portion packings, electrode portion packings and safety valve diaphragms for electric water heaters, hoses, waterproof packings and electromagnetic valves for sake warmers, waterproof packings, feed tank packings, water absorption valves, catch packings, connecting hoses, belts, warm keeping heater portion packings, steam spout seals and the like for steam oven ranges and jar rice cookers, oil packings, O-rings, drain packings, pressure tubes, blast tubes, air supply-intake packings, vibration-proof rubbers, fuel inlet packings, fuel level indicator packings, oil feed pipes, dia-

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|
| Polymer 1 | 100 | 100 | 100 | 100 | 100 |  |  | 100 | 100 | 100 | 100 | 100 |
| Polymer 2 |  |  |  |  |  | 100 | 100 |  |  |  |  |  |
| 2-Hydroxyethyl Methacrylate | 15 | 5 | 25 |  |  | 15 |  | 15 | 15 | 15 | 15 | 15 |
| Isoboronyl Acrylate |  |  |  | 10 | 20 |  | 15 |  |  |  |  |  |
| Aerosil RY200 | 5 | 4 |  |  | 5 | 5 | 5 | 5 | 5 | 5 | 5 |  |
| Organic Bentonite |  |  | 8 | 5 |  |  |  |  |  |  |  |  |
| Aerosil R711 | 5 | 3 | 8 | 10 | 5 | 5 | 5 |  |  |  |  | 5 |
| Aerosil 1 |  |  |  |  |  |  |  |  | 5 |  |  |  |
| Aerosil 2 |  |  |  |  |  |  |  |  |  | 5 |  |  |
| Aerosil 3 |  |  |  |  |  |  |  |  |  |  | 5 |  |
| Photoinitiator 1 | 3 | 3 |  |  | 3 | 3 |  | 3 | 3 | 3 | 3 | 3 |
| Photoinitiator 2 |  |  | 3 | 3 |  |  | 3 |  |  |  |  |  |
| Compression Set (%) | 7 | 12 | 10 | 11 | 9 | 12 | 13 | 25 | 23 | 24 | 25 | 20 |
| Pressure Leakage Test | Good | Good | Good | Good | Good | Good | Good | Poor | Good | Good | Good | Poor |
| Sweating Test | Good | Good | Good | Good | Good | Good | Good | Poor | Poor | Good | Poor | Good |
| Leakage Test after Scratching | Good | Good | Good | Good | Good | Good | Good | Poor | Poor | Poor | Poor | Poor |

While the invention has been described in detail and with reference to specific embodiments thereof, it will be apparent to one skilled in the art that various changes and modifications can be made therein without departing from the spirit and scope thereof.

This application is based on Japanese Patent Application No. 2005-191496) filed on Jun. 30, 2005 and the contents thereof are incorporated herein by reference.

INDUSTRIAL APPLICABILITY

The curable composition of the invention is suitable for on-site forming gaskets, particularly for on-site forming gasphragm valves, air pipes and the like for burning appliances, and speaker gaskets, speaker edges, turn table sheets, belts, pulleys and the like for acoustic instruments. In the building field, it can be used in structural gaskets (zipper gaskets), materials for pneumatic structure roofs, waterproof materials, formed sealing materials, vibration-proof materials, sound-proof materials, setting blocks, sliding materials and the like. In the sports field, it can be used in all-weather type paving materials, gym floors and the like as sports floors, shoe sole materials, inner sole materials and the like as sports shoes, and golf balls as balls for ball sports. In the vibration-proof rubber field, it can be used in automotive vibration-proof rubbers, vibration-proof rubbers for railway vehicles, aircraft vibration-proof rubbers, fender beams and the like. In the ocean and civil engineering fields, it can be used in rubber expansion joints, supports, waterstops, waterproof sheets, rubber dams, elastic pavements, vibration-proof pads, shields and the like as structural materials, rubber frames, rubber packers, rubber skirts, sponge mats, mortar hoses, mortar strainers and the like as construction associate materials, rubber sheets, air hoses and the like as construction subsidiary materials, rubber buoys, wave-dissipating materials as safety products, and oil fences, silt fences, antifouling materials, marine hoses, dredging hose, oil skimmers and the like as environmental protection products. In addition, it can also be used in rubber plates, mats, foam plates and the like.

The invention claimed is:

1. A curable composition comprising (a) a vinyl-based polymer containing at least one (meth)acryloyl group in a molecule thereof and having a number average molecular weight of 500 to 1,000,000, (b) an ethylenic unsaturated group-containing compound, (c) a thixotropic property-imparting agent, (d) fumed silica surface-treated with a (meth)acryloyl group-containing silane and (e) a photopolymerization initiator, wherein the component (c) is organic bentonite, or hydrophobic fumed silica whose surface is hydrophobically surface-treated with a silazane, a chlorosilane, an alkoxysilane or a polysiloxane which has only a methyl group as an organic substituent group bonding to a silicon atom.

2. The curable composition according to claim 1, wherein component (a) is one produced by a living radical polymerization method.

3. A sealing method comprising the steps of applying a curable composition comprising (a) a vinyl-based polymer containing at least one (meth)acryloyl group in a molecule thereof and having a number average molecular weight of 500 to 1,000,000, (b) an ethylenic unsaturated group-containing compound, (c) a thixotropic property-imparting agent, (d) fumed silica surface-treated with a (meth)acryloyl group-containing silane and (e) a photopolymerization initiator to at least one side of an article to be sealed, curing the composition by light irradiation, and then, contacting another article to be sealed to the cured composition with pressure, wherein the component (c) is organic bentonite, or hydrophobic fumed silica whose surface is hydrophobically surface-treated with a silazane, a chlorosilane, an alkoxysilane or a polysiloxane which has only a methyl group as an organic substituent group bonding to a silicon atom.

4. The sealing method according to claim 3, wherein the step of pressure contacting is performed by such force that a compressibility of the sealing material becomes a compression of 10% or more.

5. The curable composition according to claim 1, wherein the amount of component (b) is from 1 to 30 parts by weight based on 100 parts by weight of component (a).

6. The curable composition according to claim 1, wherein the amount of component (c) is from 1 to 20 parts by weight based on 100 parts by weight of the total amount of component (a) and component (b), and the amount of component (d) is from 1 to 30 parts by weight based on 100 parts by weight of the total amount of component (a) and component (b).

7. The curable composition according to claim 1, wherein component (b) is selected from the group consisting of 2-hydroxyethyl(meth)acrylate and isobornyl(meth)acrylate.

* * * * *